United States Patent [19]

Reade

[11] 4,083,709

[45] Apr. 11, 1978

[54] METHOD FOR MAKING GLASS-CERAMICS WITH FERRIMAGNETIC SURFACES

[75] Inventor: Richard F. Reade, Corning, N.Y.

[73] Assignee: Corning Glass Works, Corning, N.Y.

[21] Appl. No.: 757,590

[22] Filed: Jan. 7, 1977

[51] Int. Cl.$^2$ .......................... C03B 32/00; C03C 3/22
[52] U.S. Cl. .......................... 65/32; 65/33; 106/39.7
[58] Field of Search .................... 65/33, 32; 106/39.7, 106/39.8

[56] References Cited

U.S. PATENT DOCUMENTS

| | | | |
|---|---|---|---|
| 3,962,514 | 6/1976 | Rittler | 106/39.7 |
| 4,030,903 | 6/1977 | Rittler | 65/33 X |

FOREIGN PATENT DOCUMENTS

| | | | |
|---|---|---|---|
| 383,271 | 11/1961 | Japan | 65/32 |

*Primary Examiner*—Richard V. Fisher
*Assistant Examiner*—Frank W. Miga
*Attorney, Agent, or Firm*—Clinton S. Janes, Jr.; Clarence R. Patty, Jr.

[57] ABSTRACT

This invention relates to the manufacture of glass-ceramic articles having integral surface layers exhibiting ferrimagnetic behavior. More specifically, this invention is directed to glass bodies having compositions within the $Li_2O-Al_2O_3-Fe_2O_3-SiO_2-TiO_2$ base system, and that additionally contain NiO and/or CoO, which, when heat treated under oxidizing conditions to effect crystallization in situ to glass-ceramic articles, spontaneously develop crystallites of $NiFe_2O_4$ and/or $CoFe_2O_4$ in the surfaces thereof. The ferrite surfaces can be magnetized in a strong magnetic field and demonstrate magnetic properties eminently suitable for the recording, storage, and erasing of information.

5 Claims, No Drawings

METHOD FOR MAKING GLASS-CERAMICS WITH FERRIMAGNETIC SURFACES

BACKGROUND OF THE INVENTION

The production of glass-ceramic articles conventionally contemplates three general steps. First, a glass batch of a predetermined composition, and which commonly contains a nucleating agent, is melted. Second, the molten batch is simultaneously cooled and a glass body of a desired configuration is shaped therefrom. Third, the glass body is heat treated in a particular manner to cause the in situ growth of crystals. In the preferred heat treatment practice, the crystallization process is divided into two steps. Thus, the glass body will first be heated to a temperature in the vicinity of, or somewhat above, the transformation range of the glass to generate nuclei in the glass, after which the body will be raised to a higher temperature, customarily in excess of the softening point of the glass, to cause the growth of crystals on the nuclei.

Glass-ceramic articles are customarily highly crystalline, i.e., greater than 50% by volume crystalline, having a microstructure consisting of relatively uniformly-sized, fine-grained crystals homogeneously dispersed within a residual glassy matrix. The very high crystallinity of glass-ceramic articles gives rise to two intrinsic phenomena: (1) the chemical and physical properties thereof will be quite different from those demonstrated by the parent or precursor glass body, but will be closely similar to those of the crystal phase; and (2) the composition of the residual glassy matrix will be far different from that of the parent glass since the components incorporated within the crystal phase will have been taken therefrom. And, because glass-ceramic articles are produced through the crystallization in situ of glass article, they are non-porous and free of voids.

U.S. Pat. No. 2,920,971 provides an extensive explanation of the mechanics of production and a discussion of the microstructure of glass-ceramic articles. Reference is made to that patent for further information concerning the physical characteristics and internal structure of such articles, as well as the parameters involved in the nucleation and crystallization thereof.

DISCUSSION OF PRIOR ART

U.S. Pat. No. 3,926,602 discloses a process for preparing glass-ceramic articles having integral surface layers displaying metallic lusters. The articles were produced by heat treating glasses consisting essentially, by weight on the oxide basis, of about 0.5-3.5% FeO, 3-6% $Li_2O$, 16-21% $Al_2O_3$, 65-75% $SiO_2$, and 1.5-7% $RO_2$, wherein $RO_2$ consisted of 1.5-6% $TiO_2$ and 0-3% $ZrO_2$.

Exposing the glass articles to temperatures between about 850°-1025° C. caused the growth of beta-quartz solid solution crystals in the interior of the body and a very thin, integral surface layer containing hematite (alpha-$Fe_2O_3$) crystals. Although highly crystalline, the body portion exhibited a degree of transparency depending upon the amount of iron in the base composition.

Subjecting the glass article to a temperature above about 1050° C. yielded an opaque body as a result of the metastable beta-quartz solid solution crystals being converted into beta-spodumene solid solution. The thin hematite-containing surface layer remained but, where the heat treatment was conducted for an extended period of time, the metallic luster thereof was lost.

U.S. Pat. No. 3,962,514 describes the preparation of glass-ceramic articles containing beta-quartz and/or beta-spodumene solid solution as the predominant crystal phase which have an integral surface layer containing transition metal spinel crystals. As indicative of such spinel-type crystals, the patent recites $Mn_3O_4$, $Fe_3O_4$, $NiAl_2O_4$, $CoAl_2O_4$, $CuCr_2O_4$, $Co_3O_4$, $FeCr_2O_4$, $CoFe_2O_4$, $MnFe_2O_4$, $CrAl_2O_4$, $NiFe_2O_4$, $NiNb_2O_6$, and $MnCr_2O_4$.

The base glasses for such articles are cited as being in the $Al_2O_3$-$SiO_2$ and $Al_2O_3$-$B_2O_3$ systems with $Li_2O$ or $MnO_2$ as the principal modifying metal oxide. $TiO_2$ and/or $ZrO_2$ acts as the nucleating agent and about 0.1-10% of one or more of the transition metal oxides is included to provide the spinel crystals.

The precursor glass articles are crystallized in situ by heating between about 800°-1200° C. Subsequently, the integral surface layer containing spinel crystals is developed in situ by heating the glass-ceramic body at about 500°-1000° C. in a reducing atmosphere. Thus, all of the working examples report the firing of the glass-ceramic article in a hydrogen or forming gas (92% $N_2$ - 8% $H_2O$) atmosphere.

The final products are stated to exhibit magnetic or ferromagnetic properties but, as is apparent, the method described necessitates a process step in a reducing environment and the preferred practice contemplates treating the article with acid prior to firing in the reducing atmosphere. Both of those operations obviously add to the final cost of the products.

Furthermore, because the compositions of the parent glass are so varied and complex, the spinel-containing films frequently consist of several crystal phases.

OBJECTIVE OF THE INVENTION

The primary objective of the present invention is to provide a glass-ceramic article having an integral surface layer exhibiting ferrimagnetic behavior, which layer is developed simultaneously as the precursor glass article is crystallized in situ. That is, no additional heat treatment is required to cause the growth of crystals demonstrating ferrimagnetic properties.

SUMMARY OF THE INVENTION

I have discovered that objective can be achieved utilizing precursor glasses having base compositions within the $Li_2O$-$Al_2O_3$-$Fe_2O_3$-$SiO_2$-$TiO_2$ system, but which also contain NiO and/or CoO. Thus, I have formed opaque glass-ceramic articles having very thin, integral surface layers manifesting magnetic properties due to the presence therein of very fine-grained crystallites of $NiFe_2O_4$ (nickel ferrite) and/or $CoFe_2O_4$ (cobalt ferrite). Beta-spodumene solid solution crystals constitute the sole or predominant phase in the interior portion of the articles.

The method of the invention requires the following three general steps: first, a glass-forming batch consisting essentially, in weight percent on the oxide basis, of about 2.5-5.5% $Li_2O$, 16-27% $Al_2O_3$, 1-3% FeO, 40-75% $SiO_2$, 1.75-6% $TiO_2$, 0.5-3% NiO, and/or 1-3% CoO, the sum NiO + CoO not exceeding about 4%, is melted; second, the melt is simultaneously cooled to a temperature at least within the transformation range (optionally to room temperature) and a glass article of a desired geometry shaped therefrom; and, third, the glass article is exposed in an oxidizing atmosphere to a temperature between about 900°-1300° C. for a period of time adequate to cause the in situ growth of beta-spodumene solid solution crystals in the interior portion of the article and nickel ferrite and/or cobalt ferrite crystallites in a thin surface layer.

Somewhat denser and more uniformly-sized crystallization may be obtained where crystallization is undertaken in two steps. Thus, the glass article will initially be heated to a temperature at or somewhat above the transformation range and maintained at such temperature for a sufficient length of time to effect the substantial growth of nuclei within the glass. Subsequently, the glass body will be raised to a temperature above the softening point thereof to cause the growth of crystals on the nuclei. Hence, the preferred practice contemplates maintaining the glass article within the nucleation range of about 700°-850° C. for about 1-6 hours, and then exposing the article to the crystallization range of about 900°-1300° C. for about 1-8 hours.

It is well-known that the rate of crystallization is highly dependent upon temperature and, secondarily, upon composition. Therefore, longer exposure periods, perhaps up to 24 hours and longer, may be demanded for certain compositions to secure the desired high crystallinity or superior surface development, where temperatures at the cooler extreme of the crystallization range are employed. At the other extreme, exposure times as brief as 0.25 hour may be satisfactory where temperatures at the upper end of the crystallization range are utilized.

[The transformation range has been defined as that temperature at which a liquid melt is converted into an amorphous solid, that temperature being deemed to lie in the vicinity of the glass annealing point.]

DESCRIPTION OF PREFERRED EMBODIMENTS

Table I reports several glass compositions, expressed in parts by weight on the oxide basis, which are operable in the instant invention. Because the total of the individual ingredients equals or closely approximates 100, the compositions can, for practical purposes, be deemed to be reported in terms of weight percent. The actual batch constituents may comprise any material, either the oxides or other compounds, which, when melted together, will be transformed into the desired oxide in the proper proportion. The batch ingredients were compounded, ballmilled together to assist in securing a homogeneous melt, and thereafter placed into platinum crucibles. The crucibles were covered, positioned in a furnace, and the batches melted at 1650° C. for 16 hours, with stirring. The melts were then poured into steel molds to form slabs 6 × 6 × ½ inches, and those slabs were immediately transferred to an annealer operating at 400°-650° C. $As_2O_3$ was included in the compositions to perform its customary function as a fining agent.

In the following exemplary compositions, the glass slabs were cooled to room temperature to enable an examination of glass quality to be made, and were annealed to permit sawing thereof into various test samples. This cooling to room temperature is not a vital step for the successful operation of the invention. It is required, however, that the glass article be cooled to a temperature at least within, and preferably below, the transformation range prior to the crystallization heat treatment to assure the subsequent growth of uniformly fine-grained crystallization in situ.

TABLE I

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 59.2 | 59.5 | 58.9 | 67.1 | 67.6 | 67.2 | 68.0 | 68.5 | 70.5 | 72.7 | 73.0 | 59.4 | 62.2 | 64.6 | 43.5 | 59.2 |
| $Al_2O_3$ | 26.5 | 26.1 | 25.8 | 21.4 | 20.2 | 20.0 | 20.3 | 20.0 | 17.7 | 16.2 | 16.0 | 22.2 | 20.5 | 21.3 | 38.9 | 26.5 |
| $Li_2O$ | 4.9 | 5.4 | 4.4 | 5.3 | 4.1 | 3.7 | 4.5 | 4.5 | 4.5 | 3.2 | 2.7 | 3.8 | 2.7 | 2.8 | 7.9 | 4.9 |
| $TiO_2$ | 3.2 | 3.5 | 3.5 | 2.0 | 4.0 | 4.0 | 4.0 | 1.8 | 4.5 | 4.0 | 3.2 | 5.3 | 3.1 | 3.2 | 3.9 | 3.2 |
| $As_2O_3$ | 0.7 | 0.7 | 0.6 | 0.3 | 0.5 | 0.5 | 0.5 | 0.5 | 0.2 | 0.6 | 0.6 | 0.4 | 0.4 | 0.4 | 0.5 | 0.7 |
| FeO | 2.4 | 2.4 | 2.4 | 1.3 | 2.7 | 2.7 | 1.8 | 1.8 | 1.8 | 2.2 | 2.2 | 1.2 | 1.9 | 1.9 | 2.3 | 2.4 |
| CoO | — | — | — | — | — | — | — | — | — | — | — | — | — | — | 1.2 | 1.2 |
| NiO | 2.4 | 2.5 | 2.4 | 0.7 | 0.9 | 1.9 | 0.9 | 0.9 | 0.8 | 1.1 | 2.3 | 1.2 | 1.9 | 2.0 | — | — |
| MgO | 0.7 | — | 0.7 | — | — | — | — | — | — | — | — | — | — | — | 1.9 | 0.7 |
| $ZrO_2$ | — | — | — | 2.0 | — | — | — | 1.9 | — | — | — | — | — | — | — | — |
| ZnO | 1.3 | — | 1.3 | — | — | — | — | — | — | — | — | — | — | — | — | 1.3 |
| $Na_2O$ | — | — | — | — | — | — | — | — | — | — | — | 0.3 | — | — | — | — |
| $P_2O_5$ | — | — | — | — | — | — | — | — | — | — | — | 6.2 | 7.4 | — | — | — |
| $B_2O_3$ | — | — | — | — | — | — | — | — | — | — | — | — | — | 3.7 | — | — |

| | 17 | 18 | 19 | 20 | 21 | 22 | 23 | 24 |
|---|---|---|---|---|---|---|---|---|
| $SiO_2$ | 58.9 | 67.2 | 68.1 | 73.0 | 59.4 | 64.3 | 60.5 | 60.5 |
| $Al_2O_3$ | 25.8 | 20.0 | 19.9 | 16.0 | 22.2 | 22.6 | 23.1 | 23.1 |
| $Li_2O$ | 4.4 | 3.7 | 4.1 | 2.7 | 3.8 | 5.1 | 5.2 | 5.2 |
| $TiO_2$ | 3.5 | 4.0 | 1.8 | 3.2 | 5.3 | 3.4 | 3.5 | 3.5 |
| $As_2O_3$ | 0.6 | 0.5 | 0.5 | 0.6 | 0.4 | 0.6 | 0.6 | 0.6 |
| FeO | 2.4 | 2.7 | 1.8 | 2.2 | 1.2 | 2.1 | 2.1 | 2.1 |
| CoO | 2.5 | 1.9 | 1.9 | 2.3 | 1.2 | 1.1 | 1.1 | — |
| NiO | — | — | — | — | — | — | — | 1.1 |
| $ZrO_2$ | — | — | 1.9 | — | — | — | — | — |
| $Na_2O$ | — | — | — | — | 0.3 | — | — | — |
| $P_2O_5$ | — | — | — | — | 6.2 | — | — | — |
| $B_2O_3$ | — | — | — | — | — | — | 3.1 | 3.1 |
| F | — | — | — | — | — | 1.6 | 1.7 | 1.7 |
| O ≈ F | — | — | — | — | — | −0.7 | −0.7 | −0.7 |

Since it is not known with which cation(s) the fluorine is combined, it is reported as fluoride (F) and the oxygen ≈ fluorine correction factor (O≈F) recorded in accordance with conventional glass analysis practice. In Examples 22-24, fluoride was added in the form of $AlF_3$.

Table II reports heat treatment schedules to which the glass articles of Table I were subjected to cause the crystallization in situ of fine-grained beta-spodumene solid solution as essentially the sole crystal phase in the interior portion thereof, while concurrently developing an integral thin surface layer therein in situ containing $NiFe_2O_4$ or $CoFe_2O_4$.

In the heat treatments recorded in Table II, the temperature of the glass articles was raised in an electrically-fired furnace utilizing an atmosphere of air at the rates cited therein. It will be recognized, of course, that such rates are illustrative only and not limiting. Slower or faster rates may be employed in accordance with the ingenuity of the person of ordinary skill in the glass-ceramic art.

Likewise, the use of specific dwell times and temperatures is not mandatory for the operability of the invention. The preferred practice contemplates retaining the article within the nucleation range of temperatures for a sufficient length of time to achieve good nucleation, and then raising the temperature to within the crystallization range.

After being crystallized in situ, the following examples were cooled to room temperature by merely cutting off the electric current to the furnace and allowing the samples to cool while being retained within the furnace. This practice has been termed "cooling at furnace rate" and has been estimated to average between about 3°–5° C./minute. Such practice is simply a matter of convenience and must not be taken as limiting. The determination of a practical cooling rate is well within the ambit of a person of ordinary skill in the glass-ceramic art.

TABLE II

| Schedule A: | Heat at 200° C./hour to 800° C. Hold thereat for 4 hours Heat at 200° C./hour to 1100° C. Hold thereat for 4 hours |
|---|---|
| Schedule B: | Heat at 300° C./hour to 750° C. Hold thereat for 3 hours Heat at 50° C./hour to 900° C. Hold thereat for 1 hour Heat at 250° C./hour to 1150° C. Hold thereat for 6 hours |
| Schedule C: | Heat at 300° C./hour to 800° C. Heat at 40° C./hour to 1000° C. Heat at 175° C./hour to 1150° C. Hold thereat for 7 hours |
| Schedule D: | Heat at 300° C./hour to 750° C. Heat at 20° C./hour to 850° C. Heat at 150° C./hour to 1200° C. Hold thereat for 12 hours |
| Schedule E: | Heat at 300° C./hour to 750° C. Heat at 25° C./hour to 950° C. Heat at 100° C./hour to 1225° C. Hold thereat for 24 hours |
| Schedule F: | Heat at 300° C./hour to 750° C. Heat at 25° C./hour to 850° C. Heat at 200° C./hour to 1250° C. Hold thereat for 4 hours |
| Schedule G: | Heat at 300° C./hour to 950° C. Hold thereat for 2 hours Heat at 150° C./hour to 1250° C. Hold thereat for 4 hours |
| Schedule H: | Heat at 300° C./hour to 1000° C. Heat at 200° C./hour to 1250° C. Hold for 6 hours |
| Schedule I: | Heat at 300° C./hour to 750° C. Heat at 25° C./hour to 850° C. Heat at 100° C./hour to 1250° C. Hold thereat for 8 hours |
| Schedule J: | Heat at 300° C./hour to 750° C. Heat at 50° C./hour to 950° C. Heat at 150° C./hour to 1250° C. Hold thereat for 12 hours |
| Schedule K: | Heat at 300° C./hour to 725° C. Heat at 25° C./hour to 825° C. Heat at 200° C./hour to 1200° C. Hold thereat for 24 hours |
| Schedule L: | Heat at 300° C./hour to 750° C. Heat at 25° C./hour to 850° C. Heat at 200° C./hour to 1250° C. Hold thereat for 6 hours |
| Schedule M: | Heat at 300° C./hour to 900° C. Hold thereat for 4 hours |

Table III records a visual color description of the crystallized body along with measurements of the remanent magnetic flux, expressed in Maxwells/cm, and the coercive force, expressed in Oersteds.

Electron microscopic examination and X-ray diffraction analyses of the interior portions of the inventive articles have shown them to be highly crystalline, i.e., greater than 50% by volume and, frequently, in excess of 75%, with beta-spodumene solid solution being essentially the sole crystal phase present.

Electron diffraction and X-ray diffraction analyses of the thin surface layer, i.e., the thickness thereof does not exceed about several thousand angstroms, indicated high crystallinity with the presence of $NiFe_2O_4$ or $CoFe_2O_4$, depending upon the use of NiO or CoO.

The glass-ceramic articles were magnetized and the magnetic properties measured via the application of a strong magnetic field thereto. The strength of the applied field was increased until the test sample was magnetically saturated. The applied field was thereafter reduced to zero and the degree of permanent magnetism of the sample measured in terms of the remanent magnetic flux. The coercive force necessary to demagnetize the sample was determined through the application of a magnetic field of increasing strength with reverse polarity.

TABLE III

| Ex. No. | Heat Treatment | Visual Description | Remanent Flux | Coercive Force |
|---|---|---|---|---|
| 1 | Schedule D | Dull slate | | |
| 1 | Schedule G | Charcoal | 0.05 | 98 |
| 1 | Schedule J | Charcoal | | |
| 2 | Schedule H | Dull violet-gray | | |
| 3 | Schedule H | " | | |
| 4 | Schedule E | Dull black-brown | | |
| 5 | Schedule A | Dull gray-brown | | |
| 5 | Schedule F | Charcoal | 0.05 | 248 |
| 5 | Schedule D | " | 0.12 | 144 |
| 6 | Schedule F | " | 0.22 | 491 |
| 7 | Schedule I | " | 0.05 | 234 |
| 7 | Schedule L | " | 0.06 | 199 |
| 8 | Schedule E | " | 0.07 | 155 |
| 9 | Schedule I | Deep red-brown | 0.01 | 487 |
| 10 | Schedule G | Dull black-brown | 0.03 | 883 |
| 11 | Schedule B | Satiny black-brown | | |
| 12 | Schedule C | " | | |
| 13 | Schedule C | Lustrous violet-brown | | |
| 14 | Schedule C | Dull brown | | |
| 15 | Schedule C | Slate | | |
| 16 | Schedule G | Dull gray | | |
| 17 | Schedule H | Charcoal | | |
| 18 | Schedule F | Dark gray | 0.20 | 259 |
| 19 | Schedule E | Charcoal | 0.11 | 265 |
| 20 | Schedule B | Dark glossy gray-green | | |
| 21 | Schedule C | Dull slate | | |
| 22 | Schedule M | Charcoal | | |
| 23 | Schedule M | Dull slate | | |
| 24 | Schedule M | Dull gray-brown | | |

As can be seen from Examples 1–24, the compositions are founded in the system $Li_2O.Al_2O_3.nSiO_2$ with FeO, NiO, and CoO being substituted for $Li_2O$ on a mole-for-mole basis. In this manner, the molar ratio $Al_2O_3:(Li_2O + RO)$ is maintained at least equal to and, preferably, greater than unity. This compositional control assists in insuring glass-ceramic articles with fine-grained (normally less than 1 micron in diameter) beta-spodumene solid solution crystals with a minimum of distortion and/or cracking. Also, control of that molar ratio appears to enhance the development of the ferrite surface layer.

The values of $n$ for $SiO_2$ can range from 2 (Example 15) to 8 (Examples 11 and 20). In general, the heat treatment first produces a metastable beta-quartz solid solution with little, if any, development of cobalt or nickel ferrite crystals. As the temperature of the articles is raised above about 1000° C., the beta-quartz is converted to a stable beta-spodumene solid solution with the concurrent development of the desired ferrit-containing surface layer. Examples 22-24 are unusual in demonstrating excellent fine-grained beta-spodumene solid solution crystallization in the interior and strongly developed cobalt and nickel ferrite-containing surface layers after the relatively low heat treatment temperature of 900° C. Although the mechanism underlying this capability of Examples 22-24 is not fully understood, the presence of fluoride is hypothesized to act in like manner to a mineralizer. Moreover, the fluxing action of $B_2O_3$ and fluoride in base compositions comparable to those operable in the present invention is well-known to the art.

Cobalt and nickel ferrite-containing surface layers become increasingly difficult to develop on base glass compositions where the $n$ value for $SiO_2$ is as high as 7-8 (Examples 9-11 and 20). Examples 11 and 20 represent extreme cases, where 40% of the $Li_2O$ is replaced on a mole basis with FeO, CoO, and NiO to develop ferrite surface layers. Those compositions are restricted to an upper crystallization temperature of about 1150° C. and the ferrite crystallization becomes marginal. Temperatures in excess of about 1150° C. result in excessively glassy bodies which deform badly.

The in situ crystallization of the ferrite-containing surface layer is believed to involve two fundamental steps. Initially, $Fe^{+2}$ ions diffuse to the surface of the article where they are oxidized to form hematite ($Fe_2O_3$). Thereafter, $Ni^{+2}$ or $Co^{+2}$ ions diffuse to the surface and react with the $Fe_2O_3$ to produce $NiFe_2O_4$ or $CoFe_2O_4$. Because of these circumstances, a moderate heating rate is normally utilized in raising the temperature from the cooler to the hotter extreme of the crystallization range. Also, it is because of this reaction mechanism that an oxidizing environment is demanded in the crystallization heat treatment.

Experience has shown that nickel ferrite-containing surface layers are generally easier to develop in situ than cobalt ferrites. Hence, cobalt-containing glasses having base compositions corresponding to Examples 4 and 5 did not yield surface layers containing $CoFe_2O_4$. It appears that a minimum of at least about 1% CoO is demanded for cobalt ferrite crystallization.

To confirm the presence of $CoFe_2O_4$ and $NiFe_2O_4$ in the surface layers, as identified via X-ray and electron diffraction analyses, the surface layers were etched away and chemical analyses conducted thereupon. Also, X-ray emission analyses of the in-place surfaces were undertaken.

A full explanation for the wide variety of surface appearances associated with the formation of the surface ferrite phases has not been formulated but is believed to be due, at least in part, to the thickness, crystal size, or growth habit of the ferrite crystals. It may also be caused by the presence of minor amounts of extraneous crystal phases in the surface layer. Such possible phases could include aluminates and/or titanates of cobalt, nickel, and iron.

The values for remanent flux and coercive force reported in Table III indicate that the ferrite-containing surfaces produced according to the instant invention are at least equivalent to, and can be superior to, magnetite-containing ($Fe_3O_4$) surfaces. Furthermore, the ferrite-containing surfaces are quite resistant to oxidation, whereas magnetite is thermally unstable in an oxidizing atmosphere. Thus, for example, firing a magnetite-containing surface in air to 750° C. effects complete conversion of the magnetite crystals to the non-magnetic hermatite. In contrast, the cobalt and nickel-containing surfaces are unaffected when subjected to a like treatment.

Finally, the ferrite-containing surface layers are electrical insulators whereas magnetite is well-recognized for its semiconducting characteristics.

We claim:

1. A method for making a glass-ceramic article composed of a body portion and a thin integral surface layer demonstrating ferrimagnetic properties, said body portion consisting essentially of beta-spodumene solid solution crystals dispersed within a glassy matrix and said surface layer consisting essentially of $NiFe_2O_4$ and/or $CoFe_2O_4$ crystallites dispersed within a glassy matrix, consisting of the steps of:

(a) melting a batch for a glass consisting essentially, in weight percent on the oxide basis, of about 2.5-5.5% $Li_2O$, 16-27% $Al_2O_3$, 1-3% $Fe_2O_3$, 40-75% $SiO_2$, 1.75-6% $TiO_2$, 0.5-3% NiO, and/or 1-3% CoO, the sum NiO + CoO not exceeding about 4%, said $Li_2O$, $Al_2O_3$, and $SiO_2$ being present in a molar ratio of about $Li_2O.Al_2O_3 \cdot nSiO_2$, wherein $n$ ranges between about 2-8;

(b) simultaneously cooling the melt to at least within the transformation range and shaping a glass article therefrom; and (c) exposing said glass article only in an oxidizing atmosphere to a temperature between about 900°-1300° C. for a period of time sufficient to cause the growth in situ of beta-spodumene solid solution crystals in the body portion of said glass article and of $NiFe_2O_4$ and/or $CoFe_2O_4$ crystallites in an integral surface layer on said article thereby producing a glass-ceramic article.

2. A method according to claim 1 wherein said glass article is heated to a temperature between about 900°-1300° C. for about 0.25-24 hours.

3. A method according to claim 1 wherein said glass article is heated to a temperature between about 700°-850° C. for a period of time sufficient to cause the development of nuclei therein and is thereafter heated to 900°-1300° C.

4. A method according to claim 3 wherein said glass article is heated to a temperature between about 700°-850° C. for about 1-6 hours and thereafter heated to 900°-1300° C. for about 1-8 hours.

5. A method according to claim 1 wherein said surface layer is no more than about several thousand angstroms thick.

* * * * *